June 4, 1946.  F. JUDGE  2,401,305
DIE HOLDER
Original Filed Feb. 3, 1944
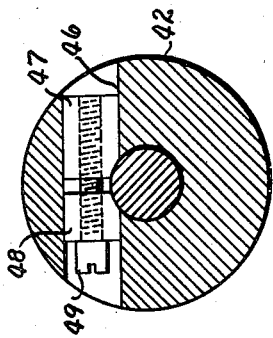
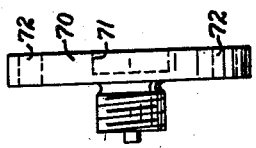
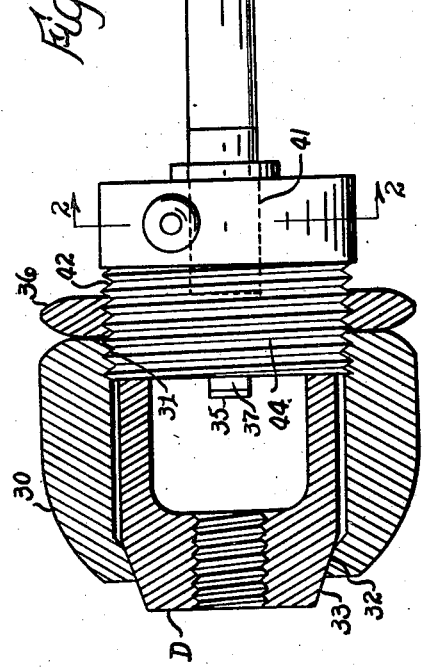
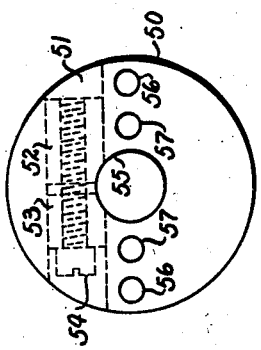
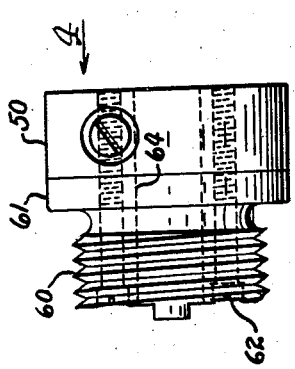
INVENTOR
Franklin Judge.
BY ATTORNEY Chas. T. Hawley Patented June 4, 1946

2,401,305

UNITED STATES PATENT OFFICE 2,401,305

DIE HOLDER

Franklin Judge, Greenfield, Mass.

Original application February 3, 1944, Serial No. 520,917, now Patent No. 2,385,922, dated October 2, 1945. Divided and this application December 26, 1944, Serial No. 569,709

3 Claims. (Cl. 10—118)

This invention relates to means for securing a die or other similar object on the end of a rotated spindle and is a division of my prior application Serial No. 520,917, filed February 3, 1944.

It is the general object of my invention to provide improved devices for such purposes, so constructed that a die may be firmly but detachably secured to the end of a driving spindle and in accurate alignment therewith.

Preferred forms of the invention are shown in the drawing, in which

Fig. 1 is a sectional side elevation of one form of my improved die holder;

Fig. 2 is a transverse sectional view, taken along the line 2—2 in Fig. 1;

Fig. 3 is a relatively simple modification of the construction shown in Fig. 1;

Fig. 4 is an end elevation, looking in the direction of the arrow 4 in Fig. 3; and Fig. 5 is a side view of a part shown in Fig. 3 but modified for use with dies of relatively small diameter.

Referring to Fig. 1, I have shown my invention as adapted for securing an acorn die D to the end of a spindle 40 having a cylindrical driving portion 41. The spindle 40 may be rotatably supported in a suitable bearing in any convenient manner. I also provide a bushing 42 having a cylindrical opening 44 closely fitting the cylindrical driving projection 41.

For clamping the bushing 42 to the spindle portion 41, I form a transverse cylindrical opening 46 (Fig. 2) in the inner end portion of the bushing 42. Cylindrical clamping blocks 47 and 48 are slidable in the opening 46 and may be drawn together by a clamping screw 49. In this manner, the bushing 42 may be firmly secured to the cylindrical projection 41 and without angular displacement by any clamping force.

An annular die holder or sleeve 30 is threaded to engage the threaded outer end 31 of the bushing 42. At its left-hand end, as shown in Fig. 1, the holder 30 has a conical inner surface 32 adapted to engage a corresponding conical outer surface 33 of the acorn die D. The die D also has a diametral slot or recess 35 fitting a rib 37 on the bushing 42.

By screwing the holder 30 firmly on the bushing 42, the die will be accurately centered in driving engagement on the end of the bushing 42, which in turn is firmly seated and accurately aligned with respect to the spindle 40. A lock nut 36 may be provided to retain the holder 30 in clamping position.

With this construction, an acorn-type die may be quickly and easily secured to a driving spindle having a cylindrical driving portion, and grinding or other desired operations may be accurately performed on the die.

In Figs. 3 and 4, I have shown a two-piece construction which may be substituted for the bushing 42 of Fig. 1. In this two-piece construction, a collar 50 is provided with a transverse opening 51, clamping blocks 52 and 53, and a clamping screw 54, all as in Fig. 2, and also with an axial opening 55 to fit the driving projection 41 of Fig. 1. The collar 50 is also provided with a pair of outer tapped holes 56 and a pair of inner tapped holes 57.

The bushing 60 on which the die holder 30 is mounted is formed as a separate piece having a flanged end 61 abutting the collar 50 and secured thereto by clamping screws 62 extending through axially extended openings in the bushing 60 and received in the inner threaded holes 57 in the collar 50. The collar 50 is narrow enough so that the driving projection 41 of the spindle 40 extends through the collar 50 and into a corresponding cylindrical opening 64 in the bushing 60, thus accurately aligning these parts.

If a die of substantially smaller size is to be mounted on the spindle 40, an adaptor plate 70 (Fig. 5) may be substituted for the bushing 60 (Fig. 3). The plate 70 has an opening 71 to receive the end of the driving projection 41, and has openings 72 to receive clamping screws threaded into the outer tapped openings 56 of collar 50. The holder and lock nut will be constructed as shown in Fig. 1, except for substantial reduction in size.

Having shown and described several forms of my improved die holder, it will be seen that I have provided very simple means for accurately securing an acorn type die on the end of a driving spindle. In all forms of the invention, the die is accurately centered and firmly held.

Having thus described my invention and the advantages thereof, I do not wish to be limited to the details herein disclosed, otherwise than as set forth in the claims, but what I claim is:

1. A die holder to be attached to a spindle having a cylindrical end projection, and comprising a die-engaging member, means to clamp a die against an end surface of said member, and transversely slidable clutch means effective to detachably secure said member to said cylindrical projection of said spindle.

2. Means to secure a die to a spindle having a cylindrical end projection, comprising a die-supporting member having an axial opening to fit said projection and having a transverse cylindrical recess laterally offset with respect to said axial opening but adjacent thereto, clutch means slidable in said cylindrical recess and oppositely engageable with the cylindrical surface of said projection, means to draw said clutch members toward each other to grip said projection, and means to center and secure a die on said die-supporting member.

3. The combination in die-securing means as set forth in claim 2, in which the die-supporting member comprises a clutch-supporting portion and a separable and exchangeable adaptor portion detachably secured thereto and on which the die is centered and mounted.

FRANKLIN JUDGE.